H. N. ANDERSON.
GEAR ROLLING MACHINE.
APPLICATION FILED JULY 16, 1914.
1,240,915.
Patented Sept. 25, 1917.
6 SHEETS—SHEET 5.
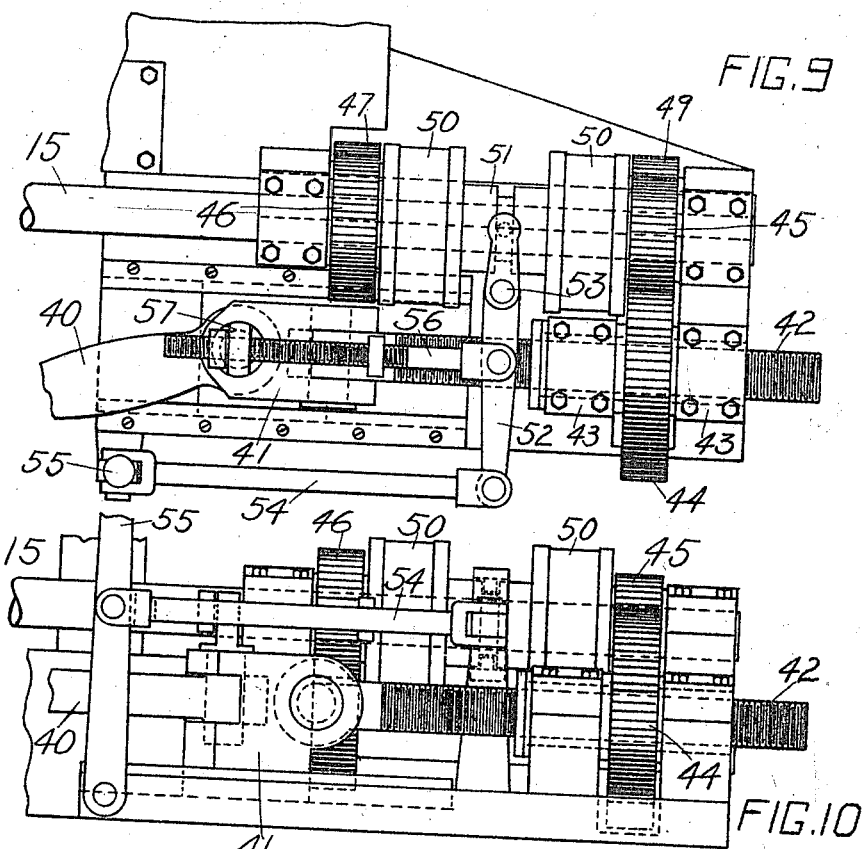
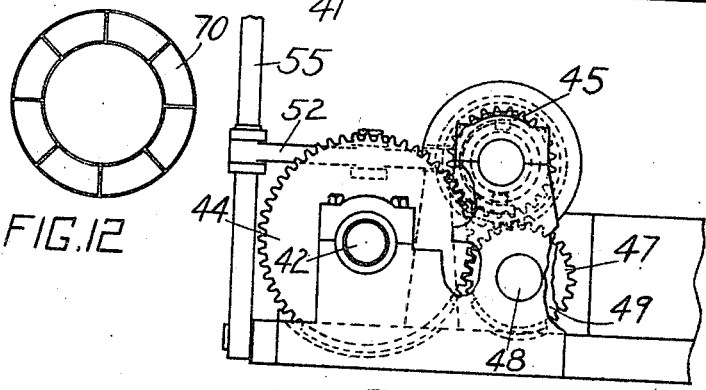

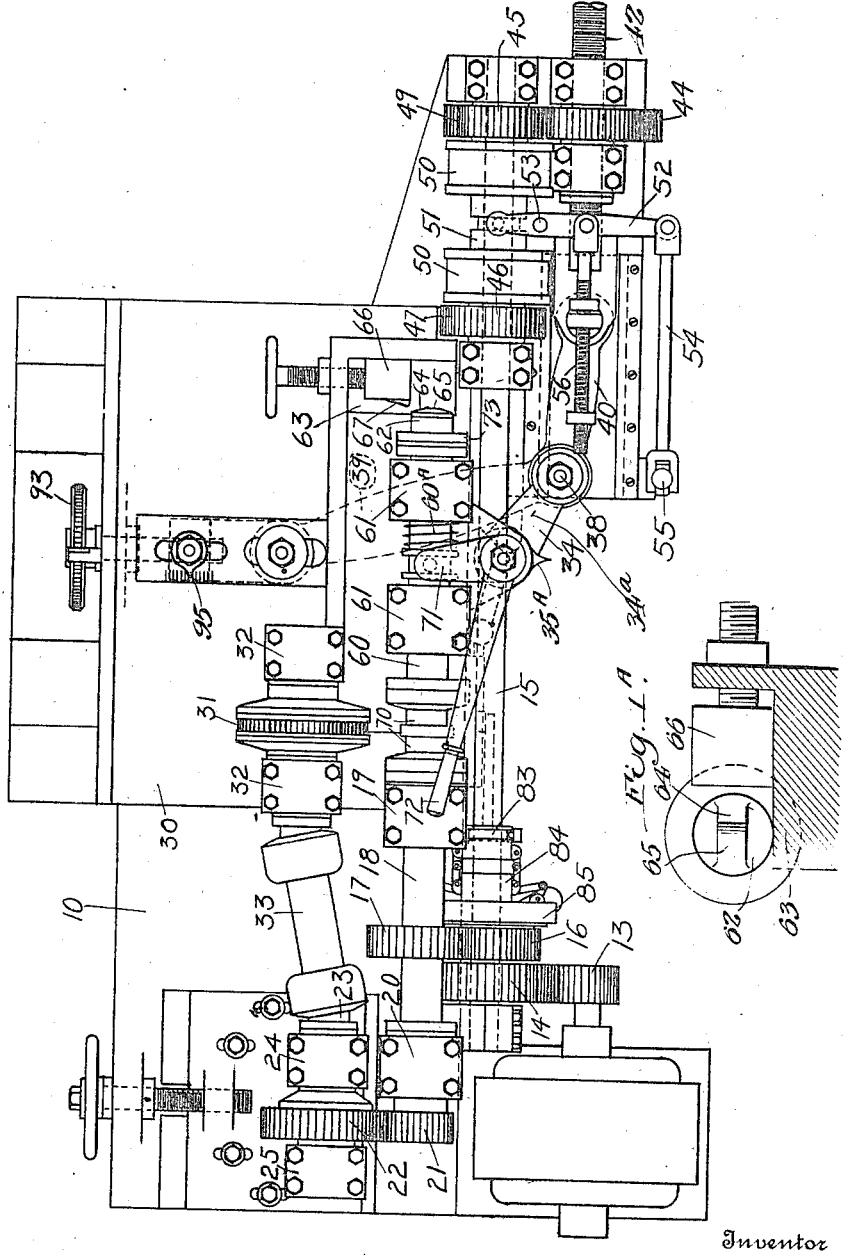

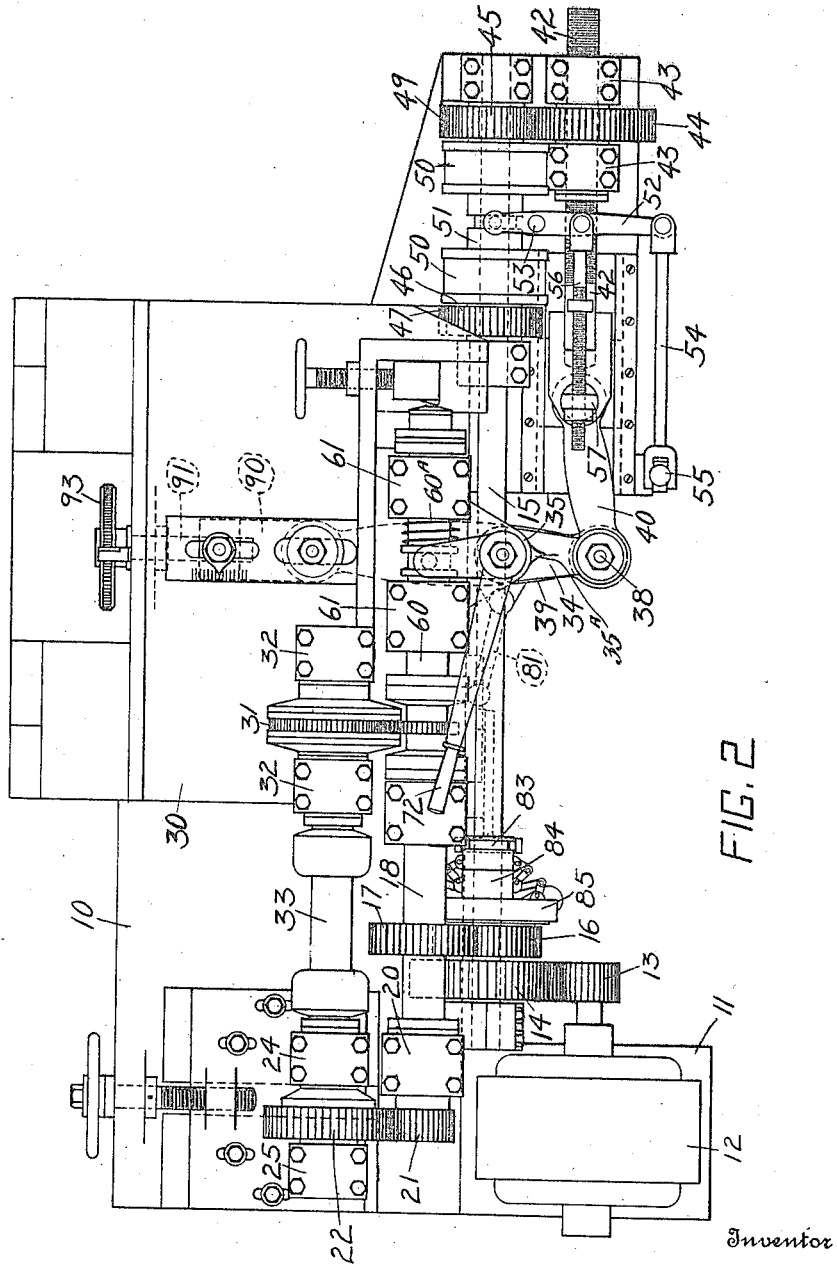

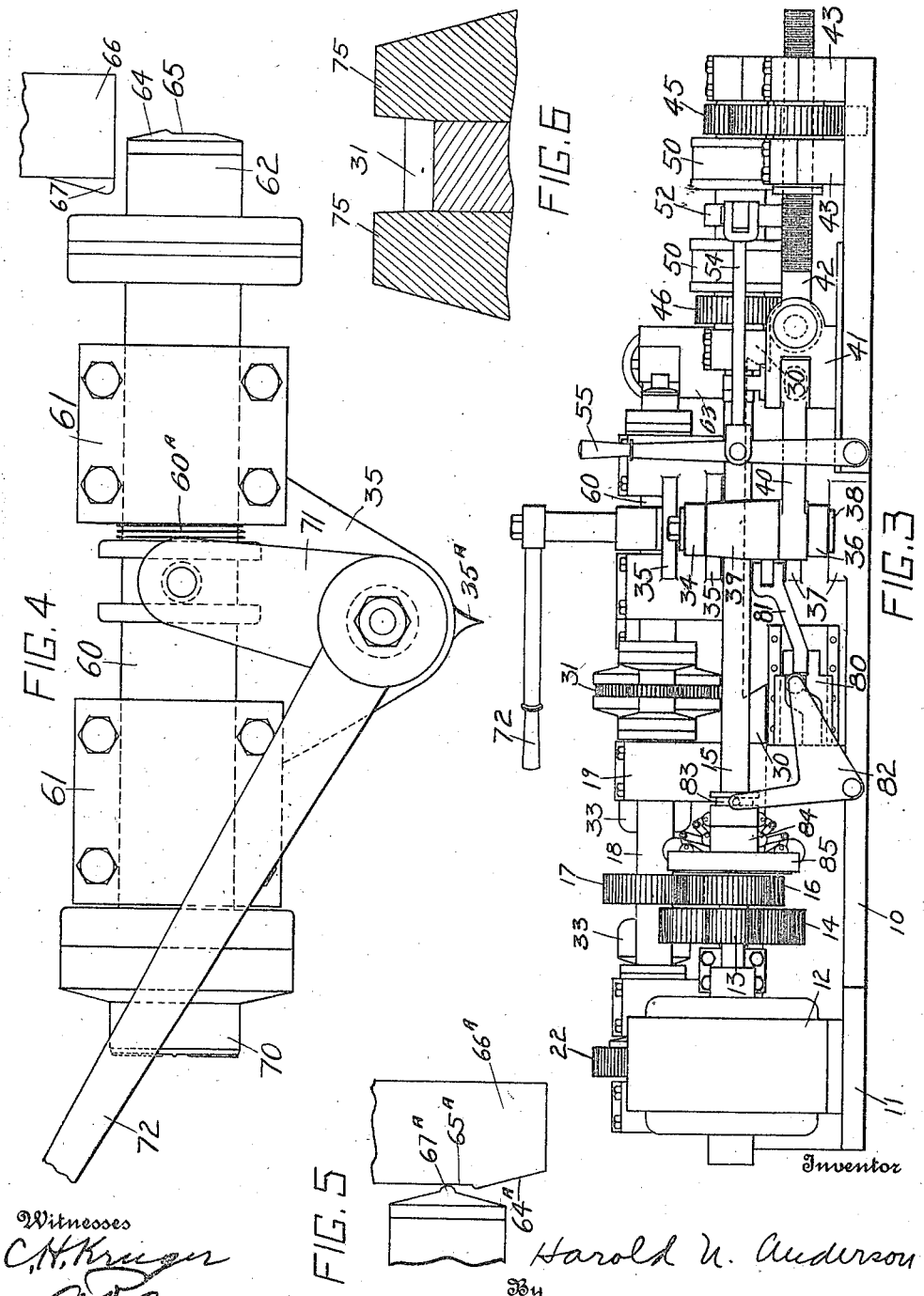

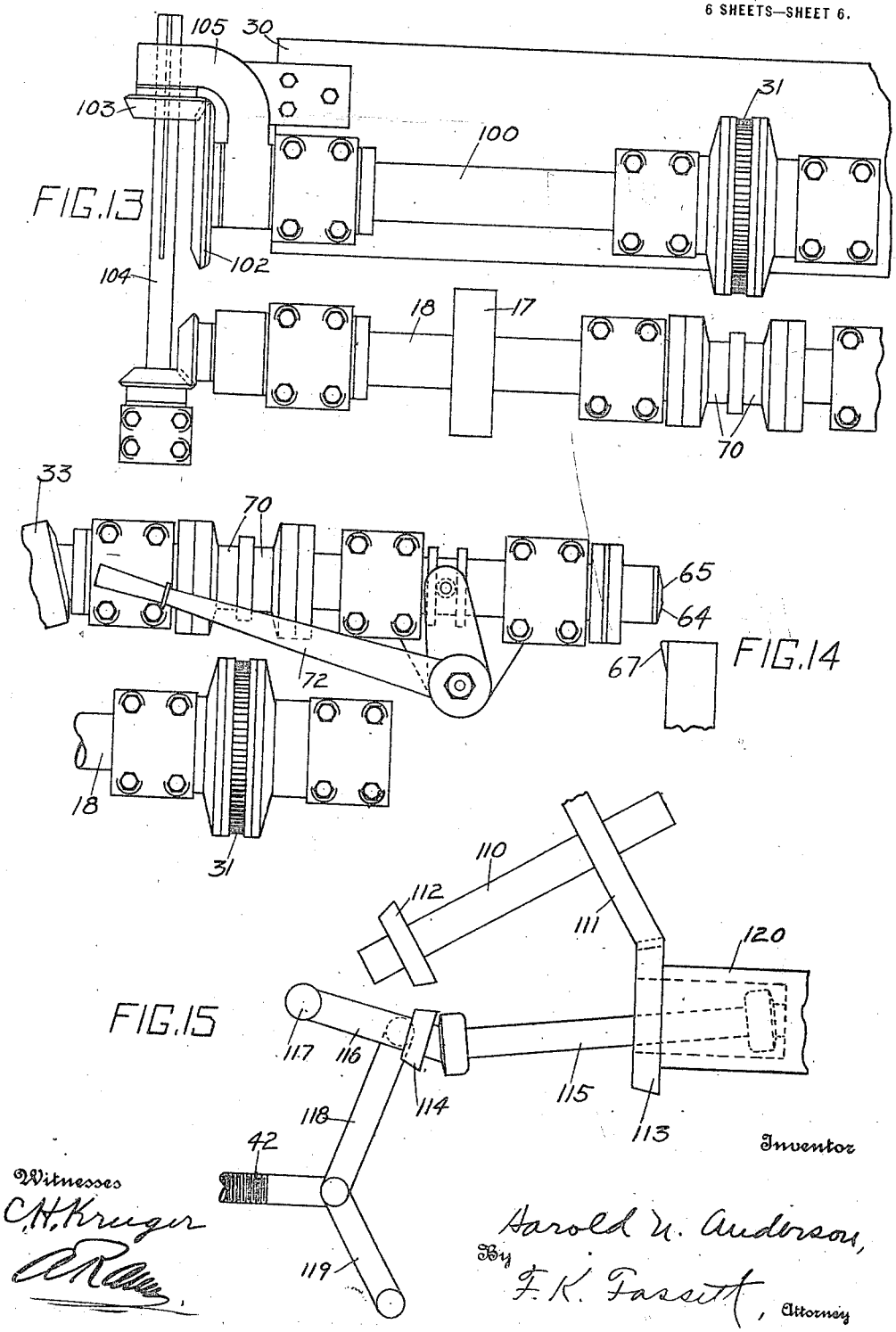

UNITED STATES PATENT OFFICE.

HAROLD N. ANDERSON, OF CLEVELAND, OHIO, ASSIGNOR TO THE ANDERSON ROLLED GEAR COMPANY, OF CLEVELAND, OHIO, A CORPORATION OF OHIO.

GEAR-ROLLING MACHINE.

1,240,915.      Specification of Letters Patent.      Patented Sept. 25, 1917.

Application filed July 16, 1914. Serial No. 851,275.

*To all whom it may concern:*

Be it known that I, HAROLD N. ANDERSON, a citizen of the United States, residing at Cleveland, in the county of Cuyahoga and State of Ohio, have invented a new and useful Improvement in Gear-Rolling Machines, of which the following is a specification.

In United States Patent Number 1,001,799, issued to me August 29, 1911, I disclosed a machine for rolling teeth on gear wheels, in which an advance over the prior art resided in maintaining substantially fixed velocity ratio between the die-roll and blank, this feature being claimed broadly. In an application co-pending herewith, Serial No. 643,010, I have shown and claimed as a specific embodiment of said broad invention means for maintaining fixed velocity ratio between the die and blank. My present invention relates more particularly to improvements in gear rolling machines and one of its objects is to insure accuracy and uniformity in the product without depending too much upon the operator. Another object is to facilitate insertion of the blanks, thereby preventing loss of heat before the rolling begins. Another object is to confine the portion of the blank which is in contact with the die, so it will not require excess metal in the blank to insure perfect teeth. Another object is to insure adequate support for the blank and prevent its moving in the holder, without imposing excessive strain on the bearings of the machine. Another object is to provide for automatically starting and stopping rotation of the blank, and another object is to provide for automatically clamping the blank in the holder before it starts to rotate and releasing it after rotation has ceased. Another object is to afford simple means for adjusting the machine so it will roll gears of given diameters and provide graduated scales to show the size for which it is set. Another object is to provide for moving the die-roll to and from the blank without moving the timing gears.

These and other objects are attained in the structure shown in the accompanying drawings in which:

Figure 1 is a plan of my machine.

Fig. 1ᴬ is a fragmental detail of parts seen in Fig. 1.

Fig. 2 is a similar plan, with the parts shown in the position they will occupy at the end of the gear rolling operation.

Fig. 3 is a front elevation of the machine with the parts in the position shown in Fig. 2.

Fig. 4 is a plan of a portion of the blank holding and clamping mechanism, at the time a blank is being inserted.

Fig. 5 is a detail of a modification of the blank clamping device.

Fig. 6 is a fragment of the die-roll.

Fig. 9 is a plan of the mechanism for moving toggle.

Fig. 10 is an elevation of the part shown in Fig. 9.

Fig. 11 is an enlarged detail of some parts shown in Fig. 7.

Fig. 12 is a detail of the blank clamping disks.

Fig. 13 shows a structure wherein the universal joint is replaced by a transverse shaft and a bevel gear arrangement.

Fig. 14 shows a modification wherein the blank is movable instead of the die-roll.

Fig. 15 shows in rather diagrammatic form an arrangement for rolling bevel gears, using the universal joint and toggle.

Similar numerals refer to similar parts throughout the several views.

Figure 7:
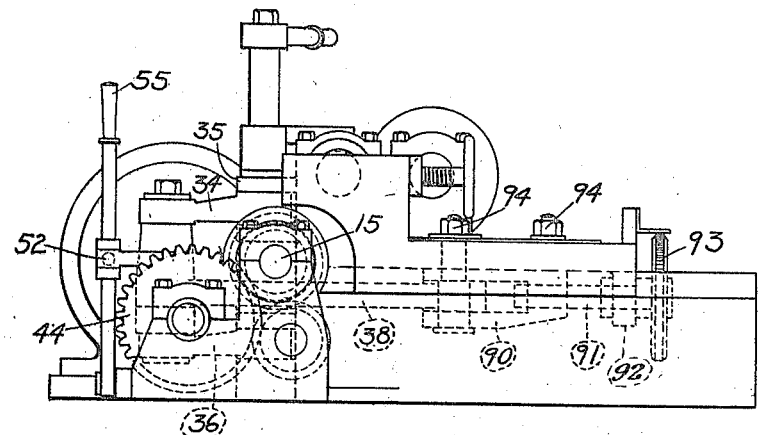
Figs. 7 and 8 are elevations respectively of the right and left hand end of the machine.
Figure 8:
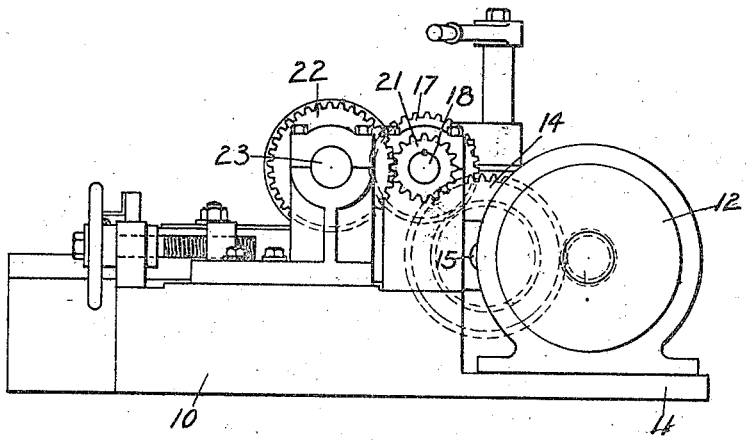

The several parts of my machine are mounted on a base 10 which has an extension 11 to carry the motor 12. The motor pinion 13 meshes with a gear 14 carried by a shaft 15 mounted in suitable bearings on the base. A gear 16 loosely mounted on the shaft meshes with a gear 17 rigidly secured to a shaft 18 mounted in bearings 19 and 20. A gear 21 rigidly secured to shaft 18 meshes with a gear 22 mounted in bearings 24 and 25.

A carriage 30 is mounted to move transversely on the base and carries the die-roll 31 in bearings 32. A universal joint 33 connects the die-roll to shaft. As the structure of this joint is not part of the present invention a detailed description of its mechanism is unnecessary here. A link 34 is mounted to swing in a horizontal plane between lugs 35—35, and a similar link, 36, is mounted to swing between lugs 37—37. A shaft 38 passes through the free ends of these links and through one end of a link 39, the other end of which is connected to the carriage 30. The shaft 38 passes through another link 40, which is attached to a follower 41 arranged to slide in guides on the base. A screw 42 is connected to the follower and slides longitudinally in bearings 43—43, between which a gear 44, threaded to receive the screw, is confined. A gear 45, loosely mounted on shaft 15, meshes with this gear. A gear 46, also loosely mounted on shaft 15, meshes with a gear 47 rigidly mounted on an intermediate shaft 48, said shaft carrying another rigidly attached gear, 49, which meshes with gear 44. A clutch member 50 is rigidly attached to each of gears 45 and 46 and arranged to rotate freely on shaft 15, and a clutch member 51 is splined on the shaft between them and adapted to shift longitudinally from the position shown in the several figures to drive either gear 45 or 46 in unison with the shaft. A shifting lever 52 is pivoted at 53 and manually operated through a link 54 by a lever 55.

The thread of screw 42 is so inclined, and the direction of rotation of shaft 15 such that, assuming the shaft is rotating, if the clutch member 51 be moved to engage the clutch member 50 attached to gear 46 the follower will be moved to the left; the operation in this case being through gears 46, 47, 49, and 44. Movement of the follower to the left moves the toggle, comprising links 34, 36 and 39 into the position it occupies in Fig. 2, drawing the carriage toward shaft 18. A rod 56 attached to lever 52 passes through a lug 57 on the follower, which lug, coming in contact with a nut on the rod, rocks the lever 52 and disengages the clutch member 51 at any desired point, which is preferably when the toggle reaches a central position. A mark 34A on link 34 registers with an index 35A carried by lug 35 when the toggle is central, see Figs. 1 and 2. Throwing the member 51 to the right rotates the gear 44 in the opposite direction and returns the parts to the position shown in Fig. 1.

A longitudinally movable shaft 60 is mounted in bearings 61 carried by the base, in longitudinal alinement with shaft 18. A cam block 62 is loosely mounted on the end of this shaft and arranged to move the shaft longitudinally through a thrust bearing 62A, the lower portion of the block thereof (see Fig. 1A) being flat and resting in contact with a block 63 carried by the carriage, which keeps the cam from rotating. The cam block has an incline 64 which terminates in a slight decline and a plane 65 perpendicular to the axis of the shaft. This is most clearly seen, where it is somewhat exaggerated, in Fig. 4. A block 66 carried by the carriage has an abutment 67 which rides up the incline 64 as the carriage moves forward, and after passing down the decline before mentioned rides on the plane 65 during the remainder of the movement of the carriage. The opposing ends of the shafts 18 and 60 are provided with disks 70 having faces adapted to hold a blank. An arm 71 pivotally mounted on lug 35 carries a roller which lies in an annular groove in shaft 60. By means of an arm 72 shaft 60 may be moved longitudinally. A spring 60A moves the shaft 60 toward shaft 18 and the shaft is moved in the opposite direction by an arm 72 when a blank is to be inserted and when the arm is released the spring maintains sufficient pressure against the blank to keep it in place temporarily. The movement of the carriage is sufficient to remove the block 66 from the path of block 62, so the latter may pass the former, as in Fig. 4, when a blank is to be inserted. When the carriage is brought forward the abutment 67 engages the incline 64 and forces the shaft toward the shaft 18 thereby clamping the blank. The faces of the disks are provided with radiating ribs adapted to embed themselves in the blank (see Fig. 4) and after the abutment has passed onto the plane 65 the ribs serve to drive the blank, and prevent its changing its position with reference to the disks, notwithstanding longitudinal pressure on the shaft has been relaxed sufficiently to relieve the shafts of the end thrust. In Fig. 5 a similar result is obtained by a reversal of the parts. That is, a block 66A has an incline 64A succeeded by a short decline and a plane 65A. The lug 67A is part of a block loosely mounted on shaft 60, corresponding to block 62 in Fig. 4 and the incline 64A engages lug 67A and moves this block and hence shaft 60, thus clamping the blank as before described. Fig. 12 shows the face of a disk having both annular and radial ribs, the former to prevent expansion of the blank. A ball thrust bearing 73 is interposed between the block 62 and the shaft 60.

The die-roll is placed between shrouds 75 which confine the metal of the blank and force it to fill out the teeth. By the use of these excess metal in the blank is unnecessary. The shrouds are of such shape that the space between them increases uniformly from the bottom of the die teeth to the peripheries of the shrouds (see Fig. 6).

A follower 80 is mounted to slide on the front of the base and is connected by a link 81 to a lug on the end of link 39. A bell crank lever 82 is pivoted to the base, one arm of which carries a roller running in a cam race in the follower. The other arm is bifurcated and provided with opposing rollers which lie in an annular groove 83 in a clutch member 84 which is splined on shaft 15. The other member of this clutch, 85, is secured to gear 16. This clutch, which is normally disengaged, is thrown in when the roller on the bell crank rides up to the upper level of the race, this occurring shortly before the toggle reaches center.

The operation of the machine will now be explained: Starting with Fig. 1 and assuming the blank has been inserted between the disks 70, the lever 55 is thrown to the right, throwing the clutch member 51 into the left hand clutch member 50. Rotation of gear 44 moves the knuckle of the toggle toward the center, thereby bringing the carriage forward. The abutment 67 soon engages the incline 64 and forcing the shaft 60 to the left causes the projections to sink into the blank. About the time the abutment passes over the decline and begins to ride on the plane 65, the roller on the bell crank 82 reaches the high part of the race and throwing in the clutch 84—85 starts the blank and die-roll to rotating. Inasmuch as gears 21 and 22 have respectively the same number of teeth as the blank and die-roll, the distance from the axis of the die-roll to that of the blank will only exceed the distance between shafts 18 and 23 by about half the depth at the time the die-roll comes in contact with the blank. This is because the diameter of the blank is about that of the pitch circle of the finished gear. The universal joint 33 will therefore be so nearly parallel to shaft 18 that the speed ratio of the blank and die-roll will be substantially the same as that of the gears 21 and 22. The attachment of link 39 to the carriage 30 is by means of a block 90, to which the link is pivotally attached, and a screw 91. This screw passes through a depending lug 92 on the carriage and is threaded into the rear end of the block. The screw is turned with a hand wheel 93, having graduations on its periphery. When the proper position is attained the block is secured to the carriage by nuts 94. An index 95 carried by the block moves over a scale on the carriage. These graduations represent units of diameter while those on the hand wheel represent fractions of units.

The die-roll and blank may be allowed to rotate together for a short time with the toggle centered which will improve the surface of the teeth, particularly with respect to scale, of which there will be practically none. At the proper time the clutch 51 is thrown to the right and the parts returned to the position shown in Fig. 1. The gear 22 and die-roll may be used to roll any gear of their pitch, but the gear 21 must have the same number of teeth that the blank is to have. The bearings 24 and 25 are mounted on a separate plate which is moved backward or forward to accommodate different sizes of timing gears. The position of the block 66 is also adjustable.

Bringing the die-roll and blank together with a toggle has the advantage that the operator cannot help making the gears the correct size if the machine is properly adjusted. It has the further advantage of bringing the die up to the blank rapidly compared to its progress after the rolling begins. The change is accompanied by a proportional increase in power which is also advantageous. Relaxing the clamping pressure against the blank relieves the bearings and prevents undue wear, at the same time avoiding unnecessary expenditure of power. The convenience of inserting the blank enables operation on the blank to begin within so short a time after it leaves the furnace that little heat is lost. The importance of this is due to the fact that the best results are attained when the temperature of the blank is above the critical point of the steel, and as excessive heating of the blank is undesirable, if not dangerous, the less time there is lost between the furnace and operation on the blank the better.

Fig. 13 shows a structure wherein the universal joint is replaced by an arrangement of bevel gears. This die-roll is mounted on shaft 100 journaled in bearings 101 on carriage 30, and carries a bevel gear 102 which meshes with a gear 103 splined on shaft 104. This shaft is geared to shaft 18. For the purpose of changing the number of teeth to be formed on the blank gears 102 and 103 are mounted in a frame 105 which may be removed with them and substituted by another having the desired gears attached.

In Fig. 14 the die-roll and blank are transposed.

Fig. 15 shows an arrangement for rolling bevel gears, in which a shaft 110 carries a timing gear 111 and die-roll 112. The timing gear 113 is constantly in mesh with gear 111, as gears 21 and 22 are, and is connected to drive the blank 114 by a universal joint 115, the blank being carried by a member 116 which is pivoted at 117. The screw 42 actuates the toggle 118—119, in the manner already described. The gear 113 is mounted in a hollow shaft 120, permitting the universal joint to be of considerable length without making gears 111 and 113 unnecessarily large.

Other modifications may be made without departing from the substance or exceeding the scope of the appended claims.

What I claim is as follows:

1. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, and a flexible connection between the die-roll and second gear whereby the die-roll is caused to rotate at substantially the same velocity as said second gear.

2. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, a flexible connection between the die-roll and second gear whereby the die-roll is made to rotate at substantially the same velocity as said second gear, and means for moving the rotating die-roll toward a blank mounted in the blank-holder to form teeth on the blank.

3. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, a flexible connection between the die-roll and second gear whereby the die-roll is made to rotate at substantially the same velocity as said second gear, and a toggle whereby to move the rotating die-roll and press it against a blank held in the blank-holder until teeth are formed on the blank.

4. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, a universal joint connecting the die-roll and second gear whereby the die-roll is made to rotate at substantially the same velocity as the second gear, and a toggle whereby to move the rotating die-roll and press it against a blank held in the blank-holder until teeth are formed on the blank.

5. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, means for moving the die-roll and pressing it against a blank carried by the holder, means connecting the die-roll and second gear whereby the moving die-roll is made to rotate at substantially the same velocity as the second gear, and means actuated by said die-roll moving means for clamping the blank in the holder, said means acting while the die-roll approaches but before it touches the blank.

6. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, means for moving the die-roll and pressing it against a blank carried by the holder, means connecting the die-roll and second gear whereby the moving die-roll is made to rotate at substantially the same velocity as the second gear, means actuated by said die-roll moving means for clamping the blank in the holder and subsequently relaxing the pressure slightly, said means acting while the die-roll approaches but before it touches the blank and maintaining the modified pressure until the operation of rolling teeth on the blank is finished.

7. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, a toggle for moving the die-roll and pressing it against a blank carried by the holder, a universal joint connecting the die-roll and second gear whereby they are made to rotate at substantially the same velocity, and means actuated by the toggle for clamping the blank in the holder and subsequently relaxing the pressure slightly, said means acting while the die-roll approaches but before it touches the blank and maintaining the modified pressure until the operation of rolling teeth on the blank is finished.

8. In a gear rolling machine, the combination of a rotatably mounted shaft carrying a blank-holder, a gear rigidly secured to the shaft, a second gear rotatably mounted with its axis parallel to the first and their teeth enmeshed, a die-roll rotatably mounted with its axis parallel to the shaft and capable of moving toward the shaft without disturbing the parallelism, a toggle for moving the die-roll and pressing it against a blank carried by the holder, a universal joint connecting the die-roll and second gear whereby they are made to rotate at substantially the same velocity, means actuated by the toggle for clamping the blank in the holder and subsequently relaxing the pressure slightly, said means acting while the die-roll approaches but before it touches the blank and maintaining the modified pressure until the operation of rolling teeth on the blank is finished, and an adjusting device whereby the teeth of the die-roll may be caused to sink into the blank to a predetermined depth by the time the toggle reaches its central position, said device having a graduated scale to aid in setting it.

9. In a gear rolling machine, a base, a die-roll, a carriage therefor movable on the base, a toggle to move the carriage, a rotating shaft, and means for connecting the shaft to the toggle for the purpose of operating it.

10. In a gear rolling machine, a base, a die-roll, a carriage therefor movable on the base, a toggle to move the carriage, means for operating the toggle, and screw operated adjusting means for varying the position occupied by the die-roll with reference to the base when the toggle is straight, said adjusting means having graduations whereby to set it.

11. In a gear rolling machine, a base, a die-roll, a carriage therefor movable on the base, a toggle to move the carriage, a rotating shaft, a screw connected to the knuckle of the toggle, a rotatable nut on the screw, said nut being longitudinally stationary, and a clutch to connect the nut to the shaft.

12. In a gear rolling machine, a base, a die-roll, a carriage therefor movable on the base, a toggle to move the carriage, a rotating shaft, a screw connected to the knuckle of the toggle, a rotatable nut on the screw, said nut being held from longitudinal movement with reference to the base, a clutch member loosely mounted on the shaft and having driving connection with the nut, another clutch member splined on the shaft, and means for engaging the clutch members to rotate the nut.

13. In a gear rolling machine, a base, a die-roll, a carriage therefor movable on the base, a toggle to move the carriage, a rotating shaft, a screw connected to the knuckle of the toggle, a rotatable nut on the screw, said nut being longitudinally stationary, a clutch member loosely mounted on the shaft and having driving connection with the nut, another clutch member splined, but capable of longitudinal movement, on the shaft, a lever to move said member into engagement with the first clutch member, and an adjustable throw-out to disengage the clutch members when the knuckle has moved to a predetermined point.

14. In a gear rolling machine, a base, a die-roll, a carriage therefor movable on the base, a toggle to move the carriage, a rotating shaft, a screw connected to the knuckle of the toggle, a rotatable nut on the screw, said nut being longitudinally stationary, a pair of clutch members loosely mounted on the shaft and each geared to the nut, one of them being arranged to rotate the nut in a direction opposite to that of the other, a clutch member splined but capable of longitudinal movement on the shaft, a lever for shifting said member whereby to cause the nut to be rotated, and adjustable throw-outs to disengage the clutch members when the knuckle has moved to predetermined points.

15. In a gear rolling machine, a base, a rotatable blank-holder mounted thereon, a die-roll, a carriage therefor movable on the base, a toggle to move the carriage, a rotating shaft, a screw connected to the knuckle of the toggle, a rotatable nut on the screw, said nut being longitudinally stationary, connecting means whereby the shaft may be made to rotate the nut, a clutch member connected to and adapted to rotate the blank-holder and die-roll, a companion clutch member mounted to rotate in unison with the shaft, and automatic means for engaging the clutch members when the knuckle reaches a predetermined position.

16. In a gear rolling machine, a base, a rotatable blank-holder mounted thereon, a die-roll, a carriage therefor movable on the base, a toggle to move the carriage, a rotating shaft, a screw connected to the knuckle of the toggle, a rotatable nut on the screw, said nut being longitudinally stationary, connecting means whereby the shaft may be made to rotate the nut, means for clamping a blank in the holder, said means being operated by the carriage as it moves toward the blank-holder, a clutch member connected to and adapted to rotate the blank-holder and die-roll, a companion clutch member which rotates in unison with the shaft, and automatic means for engaging the clutch members after the blank is clamped to the holder.

17. In a gear rolling machine, a pair of gears rotatably mounted upon relatively fixed axes with their teeth enmeshed, a blank holder connected to one of the gears and a die-roll adapted to roll teeth on bevel gears connected to the other, one of said connections being flexible, whereby to permit relative movement of approach between the die-roll and blank-holder.

18. In a gear rolling machine, a pair of gears rotatably mounted upon relatively fixed axes with their teeth enmeshed, a blank-holder connected to one of the gears and a die-roll adapted to roll teeth on bevel gears connected to the other, one of said connections being flexible, whereby to permit relative movement of approach between the die-roll and blank-holder, and means for causing said movement of approach.

19. In a gear rolling machine, a pair of gears rotatably mounted with their teeth enmeshed, a blank holder connected to one of the gears and a die-roll connected to the other, one of said connections being flexible, whereby to permit relative movement of approach between the die-roll and blank-holder, a toggle connecting the die-roll and blank-holder whereby to cause said movement of approach, and a device for adjusting the toggle so the die-roll will sink into the blank a predetermined depth by the time the toggle reaches its central position, said device having a graduated scale to indicate the depth of the teeth when the toggle is central.

20. In a gear rolling machine, a pair of gears rotatably mounted upon relatively fixed axes with their teeth enmeshed, a blank-holder connected to one of the gears and a die-roll adapted to roll teeth on gears connected to the other gear, one of said connections including a universal joint which permits relative movement of approach between the die-roll and blank-holder.

21. In a gear rolling machine, the combination of a pair of gears rotatably mounted upon relatively fixed axes with their teeth enmeshed and their axes parallel, a blank-holder connected to one of the gears and a die-roll adapted to roll teeth on gears connected to the other gear, one of said connections being flexible, thereby permitting relative movement of approach between the die-roll and the blank-holder.

22. In a gear rolling machine, the combination of a pair of gears rotatably mounted upon relatively fixed axes with their teeth enmeshed and their axes parallel, a blank-holder connected to one of the gears and a die-roll adapted to roll teeth on gears connected to the other gear, one of said connections being flexible, thereby permitting relative movement of approach between the die-roll and blank-holder, and means for causing said movement of approach.

23. In a gear rolling machine, the combination of a pair of gears rotatably mounted with their teeth enmeshed and their axes parallel, a blank-holder connected to one of the gears and a die-roll connected to the other gear, one of said connections being a universal joint which permits relative movement of approach between the die-roll and blank-holder.

24. In a gear rolling machine, a die, a blank-holder, an operating element, means associated with said element for producing relative movement of approach between the die and blank-holder, and means for dissociating the aforesaid means from said element when the die and blank-holder have attained a predetermined relative position.

25. In a gear rolling machine, a die, a blank-holder, operating means whereby a rolling movement is effected between the die and a blank carried by the holder, and means actuated by said operating means for producing relative movement of approach between the die and blank-holder.

26. In a gear rolling machine, a die, a blank-holder, operating means whereby rolling movement is effected between the die and a blank carried by the holder, means actuated by said operating means for producing relative movement of approach between the die and blank-holder, and means for suspending the movement of approach when the die and blank have attained a predetermined relative position.

27. In a gear rolling machine, a die, a blank-holder, operating means whereby rolling movement is effected between the die and a blank carried by the holder, and means actuated by said operating means whereby relative movement of approach between the die and blank is effected at varying velocity relative to the velocity of said rolling movement.

28. In a gear rolling machine, a die, a blank-holder, operating means whereby rolling movement is effected between the die and a blank carried by the holder, and means actuated by said operating means whereby relative movement of approach between the die and blank is effected at diminishing velocity relative to said rolling movement.

29. In a gear rolling machine, a die, a blank-holder, operating means whereby rolling movement is effected between the die and a blank carried by the holder, means actuated by said operating means, whereby relative movement of approach between the die and blank is effected, and means for suspending said movement of approach when the die and blank have attained a predetermined relative position, said means whereby movement of approach is effected being so constructed as to maintain the relative position of the die and blank after movement of approach has been suspended.

30. In a gear rolling machine, a die roll, a blank-holder, an operating element, means operated by said element for rolling the die roll on a blank carried by the holder, means operated by said element for producing relative movement of approach between the die roll and blank, and means for suspending said movement of approach when the die roll and blank have attained a desired relative position.

31. In a gear rolling machine, the combination of a pair of gears rotatably mounted with their teeth enmeshed and their axes parallel, a blank-holder connected to one of the gears and a die-roll connected to the other gear, one of said connections being a universal joint which permits relative movement of approach between the die-roll and blank-holder, and a toggle connecting the die-roll and blank-holder, whereby to cause said movement of approach.

32. In a gear rolling machine, the combination of a pair of gears rotatably mounted with their teeth enmeshed and their axes parallel, a blank-holder connected to one of the gears and a die-roll connected to the other gear, one of said connections being a universal joint which permits movement of approach between the die-roll and blank-holder; a toggle connecting the die-roll and blank-holder whereby to cause said movement of approach, and a device for adjusting the toggle so the die-roll will sink into the blank a predetermined depth by the time the toggle is in its central position, said device having a graduated scale to indicate the depth for which the toggle is set.

33. In a gear rolling machine, the combination of a longitudinally fixed rotatable shaft, a longitudinally movable rotatable shaft mounted in axial alinement with the first shaft, a disk rigidly mounted on the end of each shaft, and a gear rigidly mounted on the first shaft; a second gear rotatably mounted with its axis parallel to the first gear, said gears having their teeth enmeshed, a die-roll rotatably mounted with its axis parallel to that of the shafts and capable of moving toward and away from the shafts without disturbing said parallelism, and a connection between the die-roll and second gear whereby they are made to rotate at substantially equal velocities as the die-roll approaches a blank held between the disks.

34. In a gear rolling machine, a tooth-forming die, a blank-holder, and means of a nature to produce movement of approach therebetween until they are a predetermined distance apart and then automatically suspend said movement of approach.

35. In a gear rolling machine, a tooth-forming die, a blank-holder, means of a nature to produce movement of approach therebetween until they are a predetermined distance apart, and then automatically suspend said movement of approach, and means for adjusting said moving means so it will bring them to any desired distance apart.

36. In a gear rolling machine, a tooth-forming die, a blank-holder, and means for producing movement of approach therebetween, with constantly diminishing velocity and proportionately increasing power.

37. In a gear rolling machine, a base, a longitudinally fixed shaft and a longitudinally movable shaft mounted in bearings on the base with their axes in alinement, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, a toggle whereby to move the carriage, a clutch to connect the rotating shaft with one of the blank-carrying shafts, and a connection between the toggle and clutch whereby to throw in the clutch when the carriage reaches a predetermined point.

38. In a gear rolling machine, a base, a longitudinally fixed shaft and a longitudinally movable shaft mounted in bearings on the base with their axes in alinement, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, means for moving the carriage, a clutch to connect the rotating shaft with one of the blank-carrying shafts, and automatic means for throwing in the clutch when the abutment has reached the plane.

39. In a gear rolling machine, a base, a longitudinally fixed shaft and a longitudinally movable shaft mounted in bearings on the base with their axes in alinment, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, a toggle whereby to move the carriage, a clutch to connect the rotating shaft with one of the blank-carrying shafts, a connection between the toggle and clutch whereby to throw in the clutch when the carriage reaches a predetermined point with reference to the blank-carrying shafts, and screw operated adjusting means for varying the distance between the axes of the die-roll and blank when the toggle is centered, said means having graduations to indicate said distance.

40. In a gear rolling machine, a base, a longitudinally fixed shaft and a longitudinally movable shaft mounted in bearings on the base with their axes in alinement, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, a toggle whereby to move the carriage, automatic means for connecting the rotating shaft to the blank-carrying shaft when the abutment has reached the plane, and means for adjusting the position of the abutment with reference to the carriage.

41. In a gear rolling machine, a base, a longitudinally fixed shaft and a longitudinally movable shaft mounted in bearings on the base with their axes in alinement, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, a toggle whereby to move the carriage, a clutch to connect the rotating shaft with one of the blank-carrying shafts, a connection between the toggle and clutch whereby the clutch is thrown in when the carriage reaches a predetermined point, a screw to operate the toggle, and a clutch to connect the screw with the rotating shaft.

42. In a gear rolling machine, a base, a longitudinally fixed shaft and a longitudinally movable shaft mounted in bearings on the base with their axes in alinement, the adjacent ends of the shafts being adapted to receive and clamp a blank between them; a carriage, adapted to support a die-roll, transversely movable on the base, an abutment on the carriage and a cam on the movable shaft, said cam having an incline whereon the abutment rides as the carriage approaches the shafts and forces the movable toward the fixed shaft to clamp a blank between them, and a plane perpendicular to the shaft whereon the abutment rides after it has passed the incline, said plane being slightly lower than the highest part of the incline, thereby permitting a slight retrogression of the shaft and consequent relief of end thrust in the bearings; a constantly rotating shaft, a toggle whereby to move the carriage, a clutch to connect the rotating shaft to one of the blank-carrying shafts, a connection between the toggle and clutch whereby the clutch is thrown in when the carriage reaches a predetermined point, a screw to operate the toggle, and means whereby the rotating shaft may be made to rotate the screw in either direction.

43. In a gear rolling machine, the combination of a rotatably mounted shaft carrying a blank-holder, a gear rigidly secured to the shaft, a second gear rotatably mounted with its axis parallel to the first and their teeth enmeshed, a die-roll adapted to roll teeth on gears rotatably mounted with its axis parallel to the shaft and capable of moving toward the shaft without disturbing the parallelism, and a connection between the die-roll and second gear so constructed that they rotate at the same velocity while permitting the die-roll to approach the shaft.

44. In a gear rolling machine, a pair of gears rotatably mounted with their teeth enmeshed and their axes fixed with reference to each other, a blank-holder connected to one of the gears and a die-roll adapted to roll teeth on gears connected to the other, one of said connections being so constructed that the distance between the die-roll and blank-holder may be varied with no variation in their velocity ratio.

45. In a gear rolling machine, a blank-holder and a die-roll rotatably mounted with their axes constantly parallel, means for varying the distance between said axes, and connecting means comprising gears with relatively fixed axes, whereby the blank-holder and die-roll are caused to rotate at fixed speed ratio while said distance varies.

46. In a gear rolling machine, a die-roll and a blank-holder rotatably mounted with their axes constantly parallel, means for varying the distance between said axes and means for maintaining substantially fixed velocity ratio during said variation.

47. In a gear rolling machine, a die-roll and a blank holder rotatably mounted with their axes constantly parallel, means for varying the distance between said axes, and means for maintaining fixed speed ratio between the die-roll and blank-holder, said means comprising intermeshing gears and a universal joint.

48. In a gear rolling machine, a die-roll and a blank-holder rotatably mounted, means for bringing the die-roll and a blank carried by the blank-holder into contact to form teeth on the blank, and means for maintaining fixed velocity ratio between the die-roll and blank-holder, said means comprising intermeshing gears and a universal joint.

49. In a gear rolling machine, means for supporting a blank, a die-roll, an operating connection between the blank and die-roll whereby they are made to concurrently approach and roll against each other, and automatic means for causing suspension of said approach when the blank and die-roll have attained a certain relative position.

50. In a gear rolling machine, a toothed die, a rotatable blank-holder, means for clamping a blank in the holder, a rotary element for rotating the blank holder, means for pressing the die teeth into a blank clamped in the rotating holder, whereby to form teeth on said blank, and means operated by said rotary element, whereby said blank-clamping means and said means for pressing the die teeth into the rotating blank are operated successively.

51. In a gear rolling machine, means for supporting a blank, a die roll, and an automatic operating connection between the blank and die-roll whereby they are made to concurrently approach and roll against each other.

52. In a gear rolling machine, means for supporting a blank, a die-roll, and an automatic operating connection between the blank and die-roll whereby they are made to concurrently approach and roll against each other at a definite relative velocity.

53. In a gear rolling machine, means for supporting a blank, a die-roll, means for rotating the die-roll and blank, and means operatively connected to said rotating means for producing relative movement of approach between the die-roll and blank whereby to sink the die-roll teeth into the blank and form teeth thereon.

54. In a gear rolling machine, means for supporting a blank, a die-roll, means for rotating said blank and die-roll and means operatively connected to said rotating means for producing relative movement of approach between the die roll and blank at a definite velocity relative to the velocity of rotation.

55. In a gear rolling machine, means for supporting a blank, a die-roll, means for rotating said blank and die-roll, and means operatively connected to said rotating means for producing relative movement of approach between the die-roll and blank at a variable but definite velocity relative to the velocity of rotation.

56. In a gear rolling machine, means for supporting a blank, a die-roll, means for rotating the blank and die-roll, and means operatively connected to said rotating means for producing relative movement of approach between the die-roll and blank at a diminishing but definite velocity relative to the velocity of rotation.

HAROLD N. ANDERSON.

Witnesses:
  GEO. BUEHLER,
  R. W. TOUNZEAU.